US012774637B1

(12) United States Patent
Wells et al.

(10) Patent No.: US 12,774,637 B1
(45) Date of Patent: Oct. 27, 2026

(54) LADDER CAGE

(71) Applicant: Direct Scaffold Supply, LP, Houston, TX (US)

(72) Inventors: Matthew G. Wells, Houston, TX (US); Kevin Reinoso, Houston, TX (US)

(73) Assignee: Direct Scaffold Supply, LP, Houston, TX (US)

( * ) Notice: Subject to any disclaimer, the term of this patent is extended or adjusted under 35 U.S.C. 154(b) by 797 days.

(21) Appl. No.: 18/061,486

(22) Filed: Dec. 5, 2022

Related U.S. Application Data

(63) Continuation of application No. 15/876,103, filed on Jan. 19, 2018, now Pat. No. 11,519,224.

(51) Int. Cl.
*E06C 7/18* (2006.01)
*E04G 5/00* (2006.01)
*E04G 7/34* (2006.01)

(52) U.S. Cl.
CPC .............. *E06C 7/185* (2013.01); *E04G 5/001* (2013.01); *E04G 7/34* (2013.01)

(58) Field of Classification Search
CPC ......... E06C 7/185; E04G 5/16; F16B 13/0808
See application file for complete search history.

(56) References Cited

U.S. PATENT DOCUMENTS 816,779 A 4/1906 Cheek
1,349,344 A * 8/1920 O'Neill ................. F16B 21/125 411/342
1,551,124 A 8/1925 Sorrell
2,361,491 A 10/1944 Nagin
2,716,576 A * 8/1955 Nordone ................. E04G 7/305 403/49
2,786,383 A 3/1957 Bachman
2,849,258 A * 8/1958 Crook ....................... E04G 5/04 403/49
3,097,559 A 7/1963 Chapman
(Continued)

FOREIGN PATENT DOCUMENTS

DE 3316839 11/1984
DE 202011005420 8/2011
DE 202018104006 7/2018

OTHER PUBLICATIONS

"Ladder Repair—Plastic Ends", Barry et al., 1997 [retrieved by ISA on Mar. 7, 2018]; Retrieved from the internet <URL:http://beamalarm.com/Documents/ladder_repair.html>.

*Primary Examiner* — Colleen M Chavchavadze
(74) *Attorney, Agent, or Firm* — Melissa M. Martinez; Martinez Law Group PLLC

(57) ABSTRACT

A ladder cage containing rapid release and rapid install latching members allowing for ease of construction of the ladder cage wherein the latching members are capable of retaining the cage ring connecting members thereon without the use of external fasteners. The latching members are designed such that they may be removed from or installed on the ladder cage while the ladder cage is installed at the work site or otherwise for quick and easy repair or replacement. An exemplary ladder cage contains a plurality of ring members having a plurality of latching members interspaced around the circumference thereof, with adjacent ring members being coupled to each other through the interaction of cage ring connecting members with the latching members.

15 Claims, 9 Drawing Sheets

(56) References Cited

U.S. PATENT DOCUMENTS

| | | | | | |
|---|---|---|---|---|---|
| 3,106,986 | A * | 10/1963 | Ray | E06C 7/185 | 182/106 |
| 3,561,516 | A | 2/1971 | Reddy | | |
| 3,645,160 | A | 2/1972 | Artioli | | |
| 3,944,153 | A * | 3/1976 | Linker | B65H 54/54 | 403/330 |
| 4,430,019 | A * | 2/1984 | D'Alessio | E04G 7/26 | 182/178.1 |
| 4,553,890 | A | 11/1985 | Gulistan | | |
| 4,759,671 | A | 7/1988 | Duran | | |
| 6,872,039 | B2 * | 3/2005 | Baus | F16B 19/109 | 411/347 |
| 6,899,201 | B2 | 5/2005 | Thiessen | | |
| 6,929,094 | B1 * | 8/2005 | Kohlmeier | E06C 7/185 | 182/230 |
| 7,052,223 | B1 | 5/2006 | Miller | | |
| 7,121,382 | B2 | 10/2006 | Jackson | | |
| 7,222,696 | B2 | 5/2007 | Jackson | | |
| 10,837,230 | B1 * | 11/2020 | Curtis | E06C 7/185 | |
| 11,091,957 | B2 * | 8/2021 | Voss | E06C 7/08 | |
| 2004/0140154 | A1 | 7/2004 | Thiessen | | |
| 2005/0189172 | A1 | 9/2005 | Becker | | |
| 2006/0182514 | A1 * | 8/2006 | Ito | F16B 5/02 | 411/340 |
| 2007/0151801 | A1 | 7/2007 | Talley | | |
| 2008/0310910 | A1 | 12/2008 | Chick | | |
| 2014/0137368 | A1 | 5/2014 | Frame | | |
| 2014/0144006 | A1 | 5/2014 | Ashouri | | |
| 2018/0194166 | A1 | 7/2018 | Wells | | |
| 2018/0202230 | A1 | 7/2018 | Wells | | |

* cited by examiner

LADDER CAGE

CROSS-REFERENCE TO RELATED APPLICATIONS

This application is a continuation of U.S. non-provisional application Ser. No. 15/876,103 filed on Jan. 19, 2018, which is incorporated herein by reference as if reproduced in full below.

STATEMENT REGARDING FEDERALLY SPONSORED RESEARCH OR DEVELOPMENT

Not applicable.

FIELD OF THE DISCLOSURE

The disclosure relates generally to ladder cages and methods relating to same. More specifically, the disclosure is directed to latching members that allow for quick attachment and removal of cage ring connecting members, which allows for rapid assembly of ladder cages and rapid disassembly of the same ladder cages once they are no longer needed, and methods of constructing, disassembling, and repairing the ladder cage apparatus.

BRIEF SUMMARY OF THE DISCLOSURE

Ladder cages are commonly used in many industries. A common example of the use of ladder cages are with scaffolds. Scaffolds are commonly used to elevate workers and materials as needed for a variety of tasks, such as construction, repair, and maintenance of structures, bridges, refineries, and the like. The scaffolds utilize ladders to allow access to the various raised work platforms thereon. At least a portion of the ladder will be at least partially encircled by a ladder cage structure that will provide a safety mechanism for the workers utilizing the ladder. The ladder cage provides a structure for workers to lean against and rest as needed while utilizing the ladder. Further, the feeling of having an enclosure may help lessen the anxiety some workers experience if otherwise exposed to the height without a cage structure surrounding them.

The construction of the ladder cage includes the use of cage ring connecting members that connect the various cage rings together to produce the ladder cage structure. The cage ring connecting members are attached to the various cage rings through the use of self-contained latching members. The latching members allow for rapid installation and disassembly of the cage ring connecting members without the need for extraneous parts that may be dropped, lost, or misplaced during transit, assembly and/or disassembly, such that the ladder cage can be rapidly assembled and disassembled as needed on site. This also allows for rapid replacement of defective cage ring connecting members without the need to disassemble the ladder cage or any portion thereof other than the defective cage ring connecting member, which can then be immediately replaced utilizing the corresponding latching members that remained installed on the subject cage rings. Prior art ladder cages typically utilize bolts and nuts, and/or welds to attach the connecting members to the cage rings and to assemble the ladder cages taking time to affect the assembly and disassembly of the ladder cages and allowing for the dropping, sometimes of great heights, of nuts and/or bolts or other extraneous fasteners.

The self-contained latching members themselves may be removably attached to the cage ring such that individual latching members may be removed from the ladder cage and/or cage ring for repair or replacement as needed. This ability for individual removal of the respective latching members allows for limited to no downtime when repairs or replacements of latching members are needed thereby allowing the job to proceed on schedule. Currently, the entire cage ring or portions of the ladder cage must be removed in order to effect a replacement or repair of the cage ring connecting members themselves or of the connections for same. This causes considerable downtime and increases the expense of the project. The removal and attachment of latching members may be done on location at the work site while the ladder cage is installed or otherwise. There is no need to remove the subject cage ring or associated connecting members from the assembled and installed ladder cage in order to facilitate repairs thereon.

It is important to note that throughout this disclosure the terms, whether plural or singular, “ring” and “cage rings” and “ring member” are used to describe aspects of the ladder cage; however, the items described are not necessarily closed bands but may be of any number of geometries, such as circular, oval, square, rectangular, etc., depending on the object the ladder cage is to be used with. Further, more likely than not, the “rings” will be unclosed lengths of the various geometries. That is, the “rings” may be unclosed, or open, members of varying geometric shape wherein the opening in the “ring” is capable of attachment to another object or objects, such as a part of a ladder, scaffold, building, rig, etc.

Other features and advantages of the various embodiments of the invention will be apparent from the following detailed description, the accompanying drawings, and the appended claims.

BRIEF DESCRIPTION OF THE DRAWINGS

For a more complete understanding of the embodiments of the invention, reference is now made to the following Detailed Description of Embodiments of the Invention, taken in conjunction with the accompanying drawings, in which.

DETAILED DESCRIPTION OF EMBODIMENTS OF THE INVENTION

Figure 1:
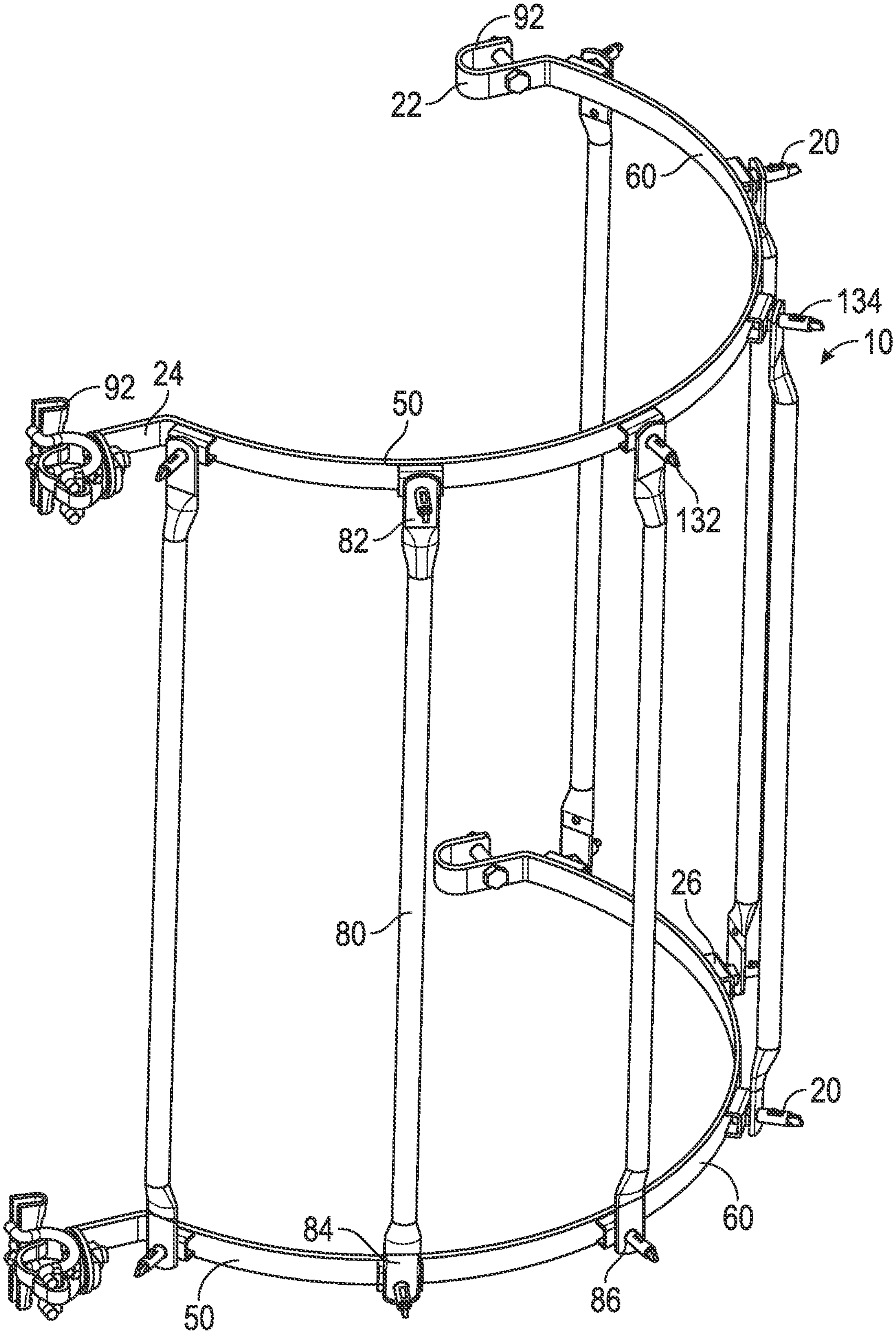
FIG. 1 is a perspective view of an exemplary embodiment of a ladder cage.
Figure 2:
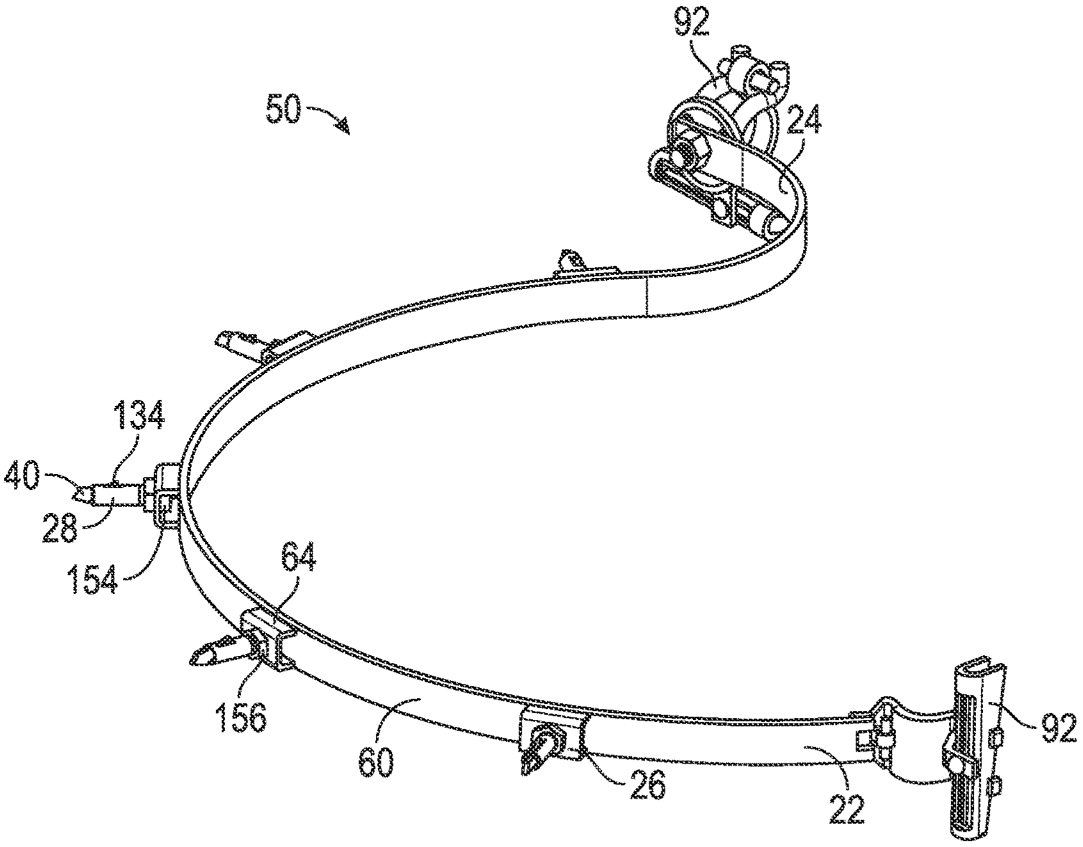
FIG. 2 is a perspective view of an exemplary embodiment of a cage ring.
Figure 2A:
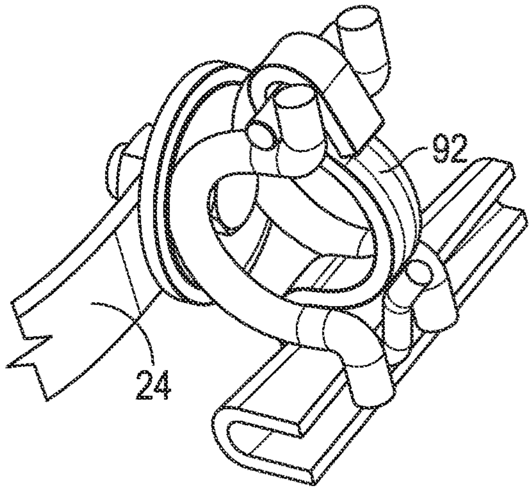
FIG. 2A is perspective view of an exemplary embodiment of a fastener.
Figure 2B:
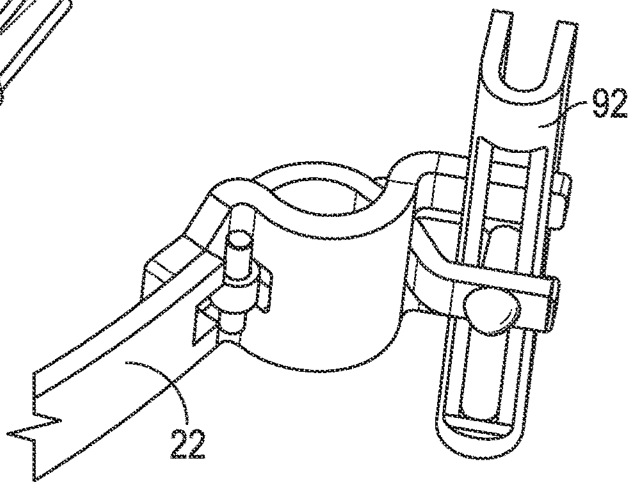
FIG. 2B is a perspective view of an alternative embodiment of a fastener.
Figure 3:
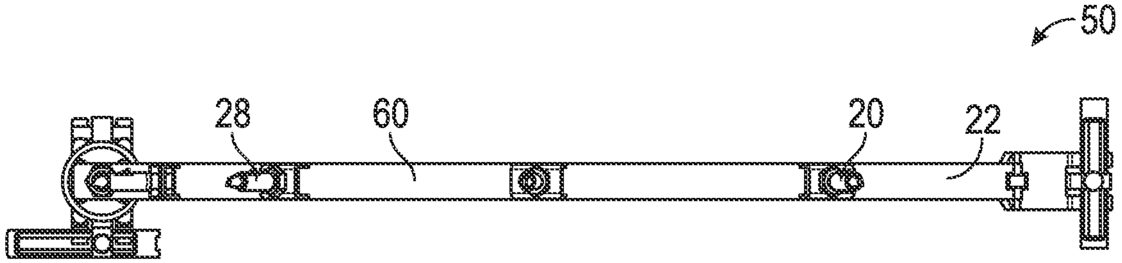
FIG. 3 is a front view of a cage ring.
Figure 4:
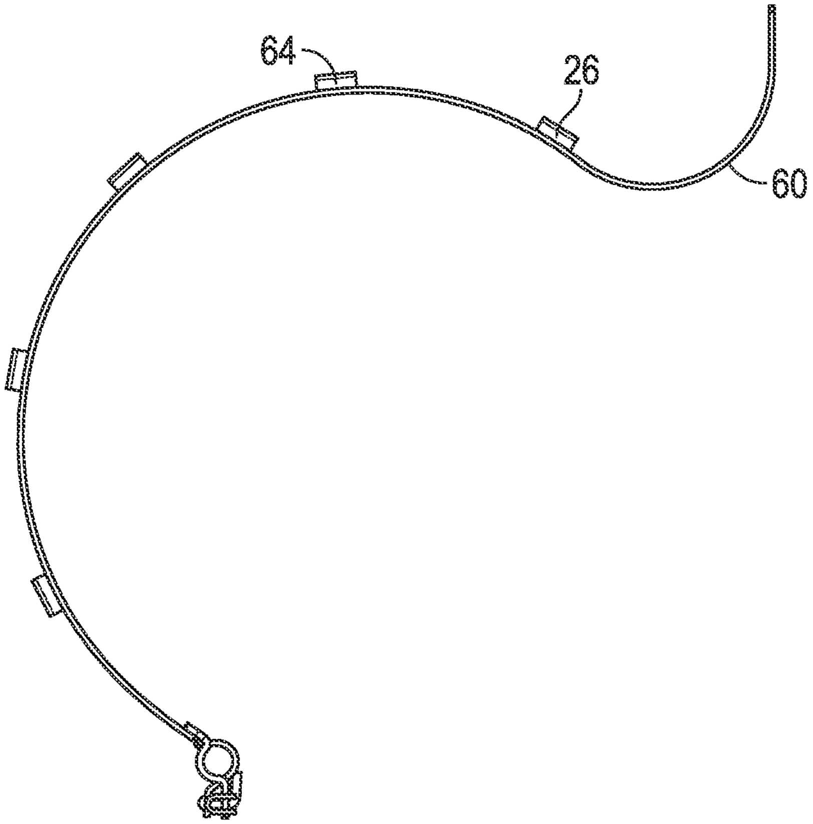
FIG. 4 is a top view of the cage ring having anchor plates spaced thereon.

The described exemplary and alternative embodiments of the invention are best understood by referring to the drawings, like numerals being used for like and corresponding parts of the various drawings.

Referring to FIG. 1, the ladder cage 10 is generally comprised of a plurality of cage rings 50 connected through a series of cage ring connecting members 80 that are coupled to the cage rings 50 via the self-contained latching members 20. The depicted exemplary embodiment of FIG. 1 shows a partially circular ladder cage 10; however, it is understood that the ladder cage 10 may be of any geometric shape or combination of different geometric shapes. The purpose of the ladder cage 10 is to at least partially enclose the area around a ladder 150; therefore, the ladder cage 10 is not limited to circular or partially circular cages and may be of a cuboidal, oval, or square shape, or any other geometric shape.

Referring to FIGS. 1, 2, 3, 4, and 5, an exemplary embodiment of a cage ring 50 is shown. The cage ring 50 is generally comprised of an elongated ring member 60 having a plurality of latching members 20 positioned along the outer surface thereof. Though the term “ring” is used as part of the name of the cage rings 50 and ring members 60, it is made explicit that the cage rings 50 and ring members 60 are not usually rings in the usual sense of the word, i.e., circular closed bands, as the cage rings 50 and ring members 60 tend to at least partially encircle a ladder 150, and in various embodiments openings of platforms 76, scaffolds 100, or other objects. Therefor the “rings” 50 and 60 are not closed lengths of material, such as a band, as the “rings” 50 and 60 are discontinuous having at least two ends: a first coupling end 22 and a second coupling end 24. The first coupling end 22 and the second coupling end 24 of the rings 50 and 60 are the ends used to attach the rings 50 and 60 to a ladder 150, a scaffold 100, a platform 76, or any other object, and/or any combination of the foregoing. The particular examples of ring members 60 shown herein are generally elongated semi-circular bands of varying lengths; see for example FIGS. 1, 2, 10A, 10B, 11A, and 11B. However, it will be understood by those skilled in the art that the ring members 60, and thereby the cage rings 50, may also take other geometric shapes, such as partial squares, partial ovals, partial rectangles, etc., wherein the actual shape may be dependent on the object or objects the ladder cage 10 is to be used with and/or the shape the user or manufacturer wishes to make. The purpose of the ring members 60 and the cage rings 50 is to at least partially surround a ladder 150, a scaffold 100, a platform 76, or any other object, and/or any combination of the foregoing, and this may be accomplished with a variety of shapes and/or shape combinations.

Further, the lengths of the ring members 60, and therefore the associated cage rings 50, may also vary depending on the area to be encompassed thereby. Examples of some variations in size may be found in FIGS. 2, 10A, 10B, 11A and 11B. The longer ring members 60, FIGS. 11A and 11B, may be utilized around areas of the ladder 150 that are not adjacent platforms 76 or exits off of the ladder 150 such that the longer ring members 60 may form ladder cages 10 that completely, or nearly completely, encompass the useable area of the ladder 150. In one embodiment with the longer ring members 60, the first coupling end 22 of the ring members 60 and the second coupling end 24 of the ring members 60 will each attach to opposite sides of the ladder 150 thereby completely encircling the useable side of the ladder 150, the side that will be utilized by the users. With regard to scaffolds, longer ring members 60 may be utilized when the ladder 150 is positioned such that the rungs 151 of the ladder 150 run parallel to the portion of the scaffold 100 the ladder is placed against wherein the sides of the ladder 150 are attached directly to the scaffold 100.

Shorter ring members 60, as seen in FIGS. 1, 10A, 10B, and 12, may be utilized around areas of the ladder 150 that contain exits from the ladder 150 or entrances to the ladder 150 such that additional open space is needed in order to allow a user to step off of the ladder 150 onto a platform 76, the ground, or other area outside of the ladder 150, or to step onto the ladder 150 from a platform 76, the ground, or other area outside of the ladder 150. Accordingly, the ring members 60 may be shorter proximate the ladder 150 at the exit and/or entrance of the platform 76, the ground, or other area outside of the ladder 150 in order to accommodate rather than obstruct the additional area.

Regardless of the length or shape of the ring members 60, the first coupling end 22 and the second coupling end 24 will be shaped as needed to conform to the object proximate to each respective end 22 and 24 that the end 22 and 24 will be attached to once installed. As an example only, the first coupling end 22 of the ring member 60 depicted in FIGS. 1 and 10A angles in toward the interior of the ring member 60 then forms a U-shaped portion at its termination. This allows for this particular ring member 60 to attach to a portion of the ladder 150 shown in FIG. 12. Whereas the second coupling end 24 of the same ring member 60 initially slightly bends away from the interior of the ring member then curves away from the ring member 60 at a 90 degree angle. A fastener 92, the depicted fastener 92 is a wedge clamp capable of swiveling in relation to the ring member 60, is coupled to the second coupling end 24 so that the fastener 92 can be used to attach the ring member 60 to, in this case, a portion of a scaffold 100 adjacent an opening for entry to the platform 76.

The fasteners 92 will also vary depending on the object, such as a ladder 150 or a scaffold 100 that the ladder cage 10 is to be used with. Several fasteners 92 that may be used with the described ladder cage 10 are shown in FIGS. 1, 2, 2A, 2B, 10A, 10B, 11A, 11B, and 12. However, any now known or later discovered fastener 92 capable of retaining a portion of the ladder cage 10 onto one or more objects, such as a scaffold 100, ladder 150, platform, 76, wall, or the like, may be utilized with the disclosed invention. A function of the fasteners 92 is to functionally couple the ladder cage 10 to one or more objects such that a structure will be erected at least partially around a ladder 150.

Referring to FIGS. 2, 4, 5, 5A, and 5B, a plurality of anchor plates 26 are spaced along the outer periphery of the ring member 60. The anchor plates 26 provide anchors for the latching members 20. The spacing of the anchor plates 26 when a corresponding latching member 20 is installed therein, assuming no latching member 20 is skipped during installation of the cage ring connecting members 80, will determine the installation locations of the cage ring connecting members 80. While the depicted embodiments couple a single anchor plate 26 with a single latching member 20, it is possible to have an anchor plate 26 extend along a greater length of the ring member 60 such that more than one latching member 20 may be coupled to the extended anchor plate 26, and, therefore, possibly, more than one cage ring connecting member 80 as well. It is understood that in operation it is possible that not all of the installed latching members 20 will be coupled to a cage ring connecting member 80. The user of the ladder cage 10 may decide to skip one or more latching members 20 as they see fit during the installation of the cage ring connecting members 80. Further, an alternative embodiment may also utilize other types of self-contained latching members that are installed without the use of an anchor plate 26, such as those that are welded directly to the ring member 60 or those that are otherwise attached to the ring member 60 such as through the use spaced orifices along the ring member 60 such that nuts may be used to fasten the latching member 20 to the ring member 60 directly, or through the use of other fastening mechanisms now known or later discovered. The purpose of the anchor plate 26 being to couple the latching member 20 to the ring member 60.

The anchor plate 26 has a body member 62 and at least one ring attachment member 64 capable of attaching the anchor plate 26 to the ring member 60 while providing an open space 18 intermediate the body member 62 and the ring member 60. The anchor plate 26 depicted in FIGS. 5, 5A, and 5B contains two ring attachment members 64 extending from opposing sides of the body member 62. The positioning of the two ring attachment members 64 extending away from two opposing sides of the body member 62 forms an open space 18 that extends between the inner surfaces 17 of the ring attachment members 64 and the body member 62. The anchor plates 26 are attached to the ring member 60 through their ring attachment members 64, which are attached to the surface of the ring member 60 by welding, fastening, or any other now known or later discovered method. The purpose of the attachment is to secure the anchor plate 26 to the ring member 60 so that the plate can serve as a connection location, or anchor, for at least one latching member 20 such that the latching members 20 may be either removably or permanently attached to the ring member 60. The connection of the anchor plate 26 may be temporary, such as through the use of screws or rivets, or permanent, such as through the use of a weld.

Figure 5:
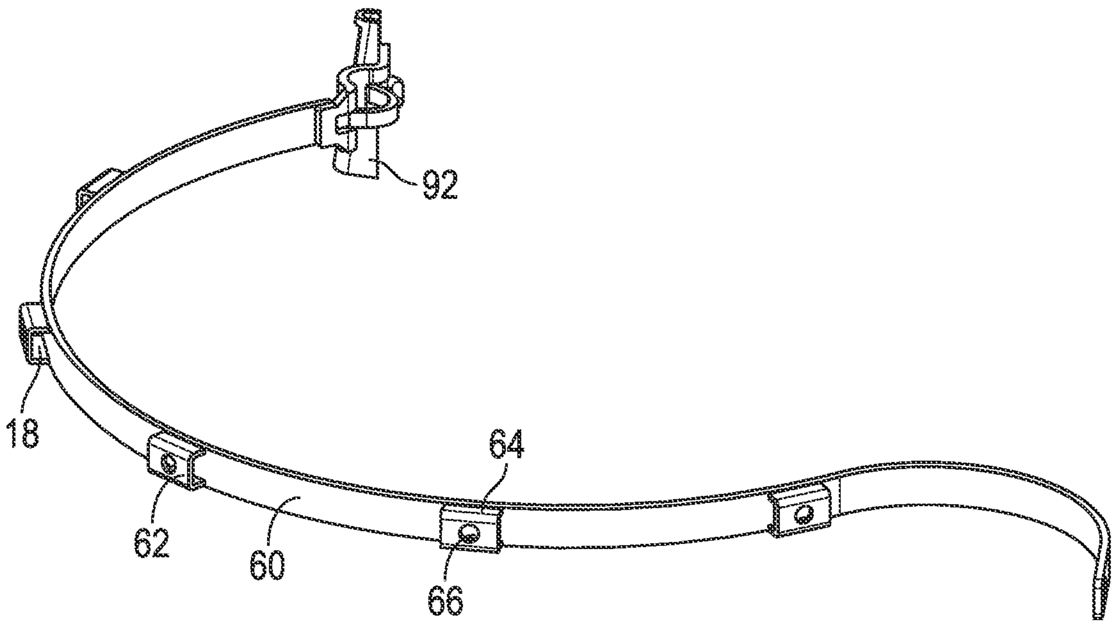
FIG. 5 is a perspective view of the exemplary embodiment of a ring member containing anchor plates installed thereon.
Figure 5A:
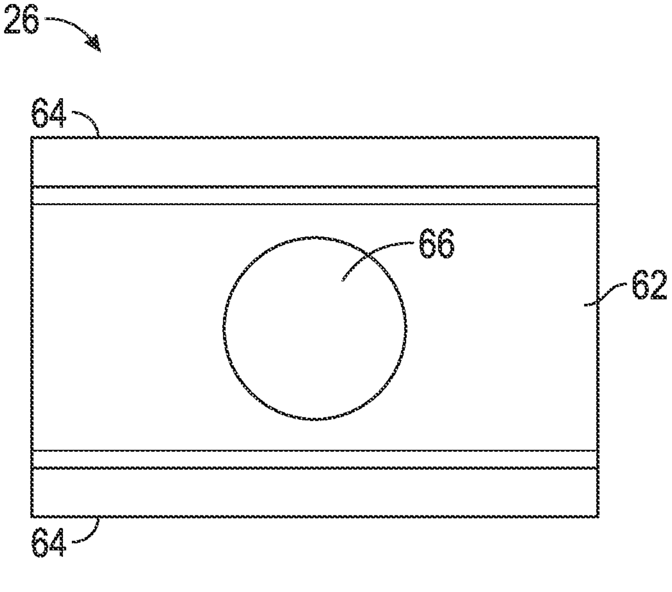
FIG. 5A is a back view of an exemplary embodiment of a anchor plate in FIG. 5.
Figure 5B:
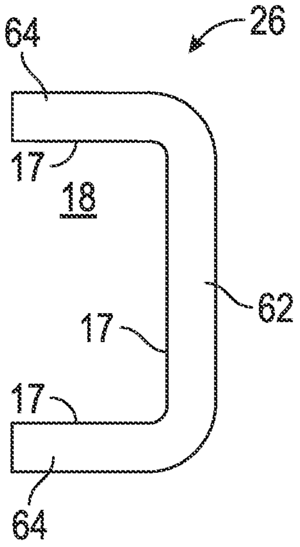
FIG. 5B is a side view of an exemplary embodiment of a anchor plate in FIG. 5A.
Figure 6:
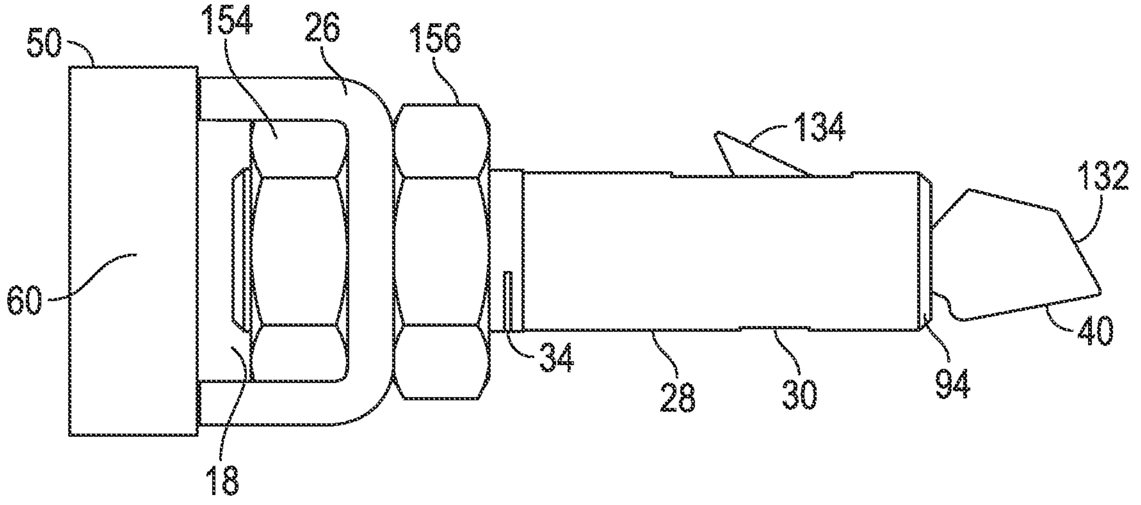
FIG. 6 is a side view of the exemplary embodiment of a latching member coupled to an anchor plate and the ring member.
Figure 7:
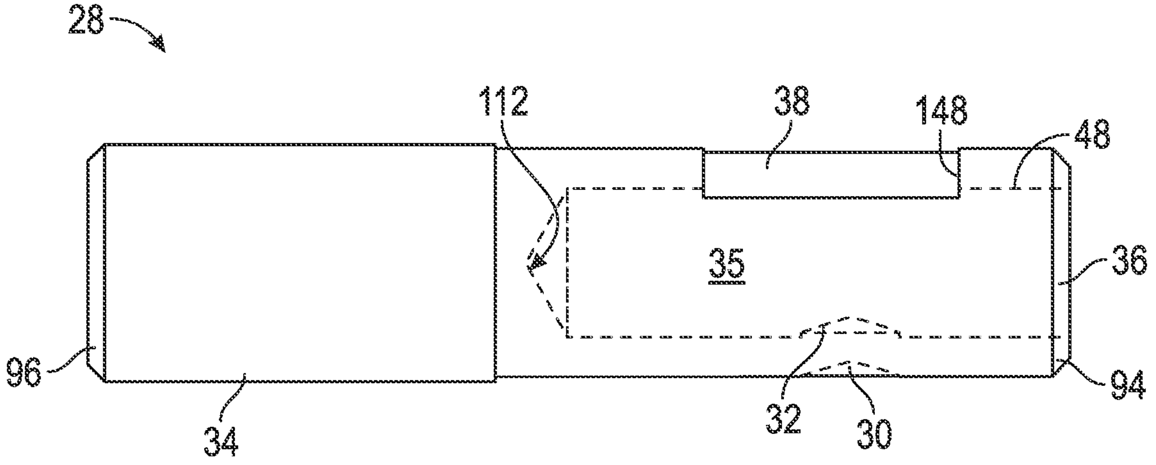
FIG. 7 is a cross-sectional view of the latching member body of an exemplary latching member.

It is preferred that the anchor plates 26 are attached to the exterior surface of the ring member 60; however, the anchor plates 26 may be attached at any location upon the ring member 60 where it is desired to contain a cage ring connecting member 80, such as the interior or top surface of the ring member 60. A depiction of exemplary spacing of the anchor plates 26 along the outer periphery of the ring member 60 is shown in FIG. 5.

Referring to FIGS. 6, 7, 8A, and 8B, an exemplary embodiment of the self-contained latching member 20 is shown. The latching member 20 comprises a latching member body 28 that is generally cylindrical in shape having a retaining end 94 and an opposite anchoring end 96. The latching member body 28 has a cavity opening 36 at its retaining end 94 from which an internal cavity 35 extends at least partially within the interior of the latching member body 28, wherein the cavity 35 ends at its innermost interior wall 112. A threaded surface 34 extends along at least a portion of the outer surface of the latching member body 28 proximate its anchoring end 96.

An internal protrusion 32 protrudes into the cavity 35 of the latching member body 28 intermediate the cavity opening 36 and the innermost interior wall 112. The internal protrusion 32 may be formed by placing enough pressure on the outside surface of the latching member body 28 to create a depression 30 along a portion of its outer surface, which will bend the material causing the internal protrusion 32. Alternatively, the internal protrusion 32 may be formed by any now known or later discovered means.

The latching member body 28 has an aperture 38 extending along at least a portion of its outer surface. The aperture 38 extends through a sidewall of the latching member body 28 thereby creating a passage from the exterior of the latching member body 28 into its cavity 35. The aperture 38 is positioned opposite the internal protrusion 32. The front edge 148 of the aperture 38 is disposed proximate the retaining end 94 of the latching member body 28. The front edge 148 of the aperture 38 and the cavity sidewall intermediate the front edge 148 and the cavity opening 36 define a cavity engagement surface 48 for engaging portions of the striking plate 78 and the retaining member 134.

While a generally cylindrical latching member body 28 is disclosed in the depicted exemplary embodiments, this shape is not a strict requirement. Alternative exemplary embodiments of the latching member body 28 may be cuboidal or prismed shaped, or of any other geometry that allows for the retainment of at least a portion of a retaining member 134 and/or a striking plate 78 along a side of the latching member body 28 for releasably retaining a cage ring connecting member 80 in position intermediate the retaining member 134 and the ring member 60.

A resilient member 42 is retained within the cavity 35 of the latching member body 28. The resilient member 42 shown is a curved strip of resilient material having a space 152 extending between its opposing arms. The resilient member 42 is capable of being compressed such that the space 152 between its opposing arms is reduced yet it is also capable of returning to its original form once the compression of the resilient member 42 is released. The resilient member 42 has respective opposing ends on its opposing arms: a stop end 120 and a retaining member engagement end 122. The base 118 of the resilient member 42, from which the opposing arms extend from, is disposed intermediate the stop end 120 and the retaining member engagement end 122.

The resilient member 42 is disposed within the cavity 35 of the latching member body 28, wherein the base 118 of the resilient member 42 abuts the innermost interior wall 112 of the cavity 35. The stop end 120 of the resilient member 42 abuts the internal protrusion 32 such that the positioning of the base 118 against the innermost interior wall 112 and the positioning of the stop end 120 against the internal protrusion 32 act to retain the resilient member 42 in position within the cavity 35, whether the resilient member 42 is under pressure and in a compressed state or not.

The width of the resilient member 42 is generally equal to the width of the cavity 35 proximate the internal protrusion 32. While the width of the resilient member 42 is preferably the same as or slightly smaller than the width of the corresponding section of the cavity 35, the width of the resilient member 42 may be uniform along the length of the resilient member 42 or may vary along the length of the resilient member 42. Alternatively, the width of the resilient member 42 may not be the same or may be slightly smaller than the width of the corresponding section of the cavity 35.

Alternative embodiments of the resilient member 42 include coiled springs, barrel type springs, and other now known or later discovered spring or spring-like materials. A purpose of the resilient member 42 is to cause the retaining member 134 to extend at least partially through the aperture 38 of the latching member body 28. A further purpose of the resilient member 42 is to compress in order to allow the retaining member 134 to be depressed by either a user, a cage ring connecting member 80, or otherwise (see FIG. 8B). A further purpose of the resilient member 42 is to return to its un-compressed state once the compressive pressure on the resilient member 42 is removed and to act on the retaining member 134 by moving the retaining member 134 into its uncompressed position (see FIG. 8A). Therefore, the resilient member 42 may be as depicted in the exemplary embodiment or may be any type of resilient member 42 with spring-like resiliency that can perform the stated functions.

Figure 8A:
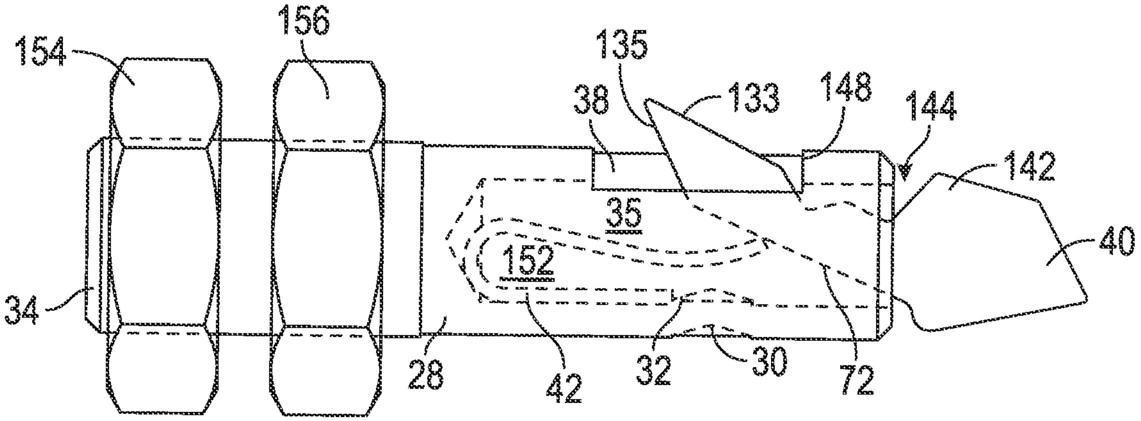
FIG. 8A is a cross-sectional view of the exemplary embodiment of the latching member of FIG. 6, without the cage ring portion or anchor plate, showing the resilient member in its uncompressed position.
Figure 8B:
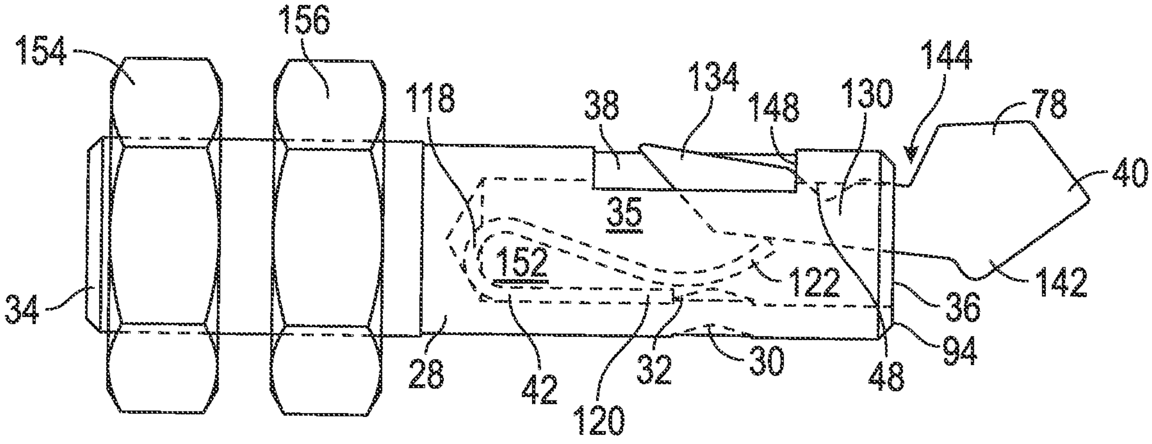
FIG. 8B is a cross-sectional view of the exemplary embodiment of the latching member of FIG. 6, without the cage ring portion or anchor plate, showing the resilient member in its compressed position.

A striking plate 78 having two opposing ends, a retaining member 134 and a striking end 40, is shown. While the depicted exemplary embodiment combines the retaining member 134 and striking end 40 on one single striking plate 78, this is not necessary as the retaining member 134 may be a stand-alone component that is contained within the aperture 38 of the latching member body 28 by its engagement with the resilient member 42 and the cavity engagement surface 48, or otherwise, such that the retaining member 134 will be positioned to perform the function of having a portion of same, the retaining end 104, extend through the aperture 38 yet be movable between a compressed position (as seen in FIG. 8B) and a non-compressed position (as seen in FIG. 8A) through the compression of the resilient member 42 or otherwise. The function of the retaining member 134 is to allow a portion of a cage ring connecting member 80 to place the retaining member 134 in a compressed state while an aperture 86 on the cage ring connecting member 80 (see FIG. 9) is slide over the retaining member 134 to allow for the rapid placement of the cage ring connecting member 80 onto the latching member 20. The retaining member 134 will then move to its uncompressed position once the pressure exerted on it by the cage ring connecting member 80 is released through the completion of the movement of the cage ring connecting member 80 over the retaining member 134 and into its installation position on the ladder cage 10. The retaining end 104 of the retaining member 134 will extend out of the aperture 38 in the retaining member's 134 uncompressed position thereby blocking the cage ring connecting member 80 and preventing it from sliding off of the latching member 20 or from being otherwise removed from the latching member 20 until the cage ring connecting member is removed by the user or another person. To rapidly remove the cage ring connecting member 80, pressure is applied to the retaining end 104 of the retaining member 134 by any means, such as by the pressure of a thumb or finger, thereby compressing the resilient member 42 and moving the retaining member 134 from its un-compressed position to its compressed position whereby the retaining end 104 is lowered into the aperture 38. The lowering of the retaining end 104 at least partially into the aperture 38 allows enough clearance for the aperture 86 of the cage ring connecting member 80 to slide over the retaining member 134 thereby allowing the cage ring connecting member's 80 removal from the latching member 20.

The depicted retaining end 104 of the retaining member 134 extends through and outside of the aperture 38 of the latching member body 28. The retaining member engagement end 122 of the resilient member 42 is positioned within the cavity 35 proximate the front edge 148 of the aperture 38. The retaining member 134 is movable between a compressed position (FIG. 8B) and a non-compressed position (FIG. 8A). The retaining member 134 is held in its substantially non-compressed position by the force placed upon it by the retaining member engagement end 122 of the resilient member 42. The retaining member 134 extends along a portion of the aperture 38 proximate the retaining member engagement end 122 of the resilient member 42 wherein the retaining member engagement end 122 makes contact with the underside 72 of the retaining member 134 thereby exerting pressure on the retaining member 134 and positioning its cavity engagement surface 130 close to or against a portion of the striking plate engagement surface 48 of the aperture 38. The retaining end 104 of the retaining member 134 extends through and out of the aperture 38 such that a portion of the retaining member 134 is extending outside of the interior of the latching member body 28. The amount of the retaining member 134 that extends outside of the latching member body 28 is dependent on the corresponding aperture 86 on the cage ring connecting members 80 that will be utilized with the latching members 20. The retaining end 104 of the retaining member 134 extends outside of the latching member body 28 enough such that the aperture 86 of the corresponding cage ring connecting member 80 will fit over the outer diameter of the latching body member 28 and over the retaining member 134 when resilient member 42 is in its compressed state and the retaining member 134 while it is in its compressed position yet the diameter of the aperture 86 of the cage ring connecting member 80 will be too small to fit over the retaining member 134 when it is in is un-compressed position such that the retaining member 134 will retain the cage ring connecting member 80 on the ladder cage 10 until it is purposely removed therefrom The engagement between the striking plate engagement surface 48 of the latching member body 28 and the cavity engagement surface 130 of the retaining member 134 when the resilient member 42 is installed and acting on the retaining member 134 will prevent the striking plate 40 from sliding out of the cavity 35. The engagement of the two surfaces 48, 130 also allows for the pivoting of the striking plate 40 when the retaining member 134 is moved to its compressed position and when the pressure on the retaining member 134 is released and it returns to its uncompressed position.

The retaining member engagement end 122 may be slightly curved upward such that the tip 126 of the end 122 may engage at least a part of the underside 72 of the retaining member 134 to bias the retaining member 134 into its uncompressed position.

The cavity engagement surface 130 depicted has four adjacent planes of varying angles that together create two notches 70. Of course, it is understood that the cavity engagement surface 130 may have any number of geometries and/or notches. The purpose of the engagement striking plate engagement surface 48 and the cavity engagement surface 130 is to allow for the interaction between the two surfaces 48 and 130 in order to maintain the striking plate 40 and its retaining member 134 in position within the cavity 35.

In the exemplary embodiment shown, the width of the striking plate 78 is generally uniform; however, the striking plate 78 may have varying widths throughout in alternative embodiments. The striking plate is at least partially retained within a portion of the cavity 35 by its placement in relation to the striking plate engagement surface 48 and the resilient member 42. The cavity engagement surface 130 of the striking plate 40 sits intermediate the retaining member 134 and the striking end 40. The depicted exemplary embodiment of the striking plate 78 is of a single construction having all three sections: the striking end 40, the cavity engagement surface 130, and the retaining member 134. It is understood that the striking end 40, the cavity engagement surface 130, and/or the retaining member 134 may alternatively be independent components retained independently in relation to the quick release latching member 20 or in any number of varying combinations.

Alternatively, the striking end 40, cavity engagement surface 130, and retaining member 134 may be in alternative arrangements, such as having a single component comprised of both the retaining member 134 and the cavity engagement surface 130, wherein the striking end 40 is formed out of the latching member body 28 itself. In this case the referenced striking plate 78 would be formed from the retaining member 134 and the cavity engagement surface 130, wherein the striking end 40 would be formed as part of the latching member body 28.

Alternatively, the striking end 40 may be an independent component, while the referenced striking plate 78 would be formed by the retaining member 134 and the cavity engagement surface 130. A further alternative embodiment may not contain a striking end 40.

The striking end 40 has a tip 136. The tip 136 is the leading edge of the striking end 40 that extends out of the cavity opening 36 of the latching member body 28 and away from the cavity 35. The tip 136 is shaped such that it will easily pass through the apertures 86 that are located on both the first ring securing portion 82 and the second ring securing portion 84 of the cage ring connecting members 80 (see FIG. 9). The tip 136 may form an acute angle 108. An exemplary acute angle is seventy-four degrees, though other angels may be utilized. While a tip 136 is not necessary for the present invention, when it is present it will be of a smaller size in relation to the portion of the striking end 40 proximate the cavity opening 36 whether the tip 136 it is shaped at an acute angle 108 or otherwise.

Generally, the preferred embodiment of the tip 132 has a smaller surface area than at least a portion of the rest of the striking end 40. Typically, the tip 132 will have a smaller surface area than the area of the striking end 40 adjacent to the tip 132.

The base 142 of the striking end 40 is located proximate the cavity engagement surface 130. The base 142 is positioned outside of the cavity 35 and at least a portion of the base 142 is larger than the diameter of the cavity 35 such that at least a portion of the base 142 will not fit inside the cavity 35. This sizing of the base 142 prevents full insertion of the striking end 40 into the cavity 35. This sizing will further aid in the construction of the latching members 20 by allowing for proper positioning of the striking plate 78 inside the cavity 35.

An open spacing 144 is maintained between the base 142 section of the striking end 40 proximate the cavity opening 36. This open spacing 144 allows for at least some movement of the striking end 40 in relation to the cavity opening 36. The movement within at least a portion of the open spacing 144 by the striking end 40 may be in response to the application of downward pressure on the retaining member 134. For example, pressure will be applied to the retaining member 134 when a cage ring connecting member 80 is installed on the latching member 20. A further example is when the retaining member 134 is depressed by a user in order to remove a previously connected cage ring connecting member 80.

The open spacing 144 may not be present in the alternative embodiments that utilize a striking end 40 that is formed from the latching member body 28 or that is otherwise fixedly connected to the latching member body 28, such as by welding or bolting. Further, the open spacing 144 may not be present in alternative embodiments that contain a striking end 40 that is not part of the striking plate 78, or that is otherwise not coupled to the retaining member 134.

The retaining member 134 of the striking plate 78 is positioned distal the tip 136. The retaining member 134 is sized to at least partially extend through the latching member aperture 38 of the latching member body 28. The latching member aperture 38 is sized to allow for downward movement of the retaining member 134 when it is depressed either by a user, by a cage ring connecting member 80, or by any other means.

The retaining member 134 has a front portion 133 that faces the direction of the cavity opening 36, and a back portion 135 that faces the ring member 60. Both the front 133 and back 135 portions extend out beyond the outer surface of the latching member body 28. The front edge 148 of the aperture 38 is located proximate the front portion 133 of the retaining member 134. The positioning of the retaining member 134 against the front edge 148 of the latching member body aperture 38 by the resilient member 42 allows the retaining member back portion 135 to remain extended away from the outer surface of the latching member body 28 such that it will act as a barrier preventing the movement of previously installed cage ring connecting members 80 from passing over it toward the direction of the striking end 40. The barrier created by the retaining member 134 thereby effectively retains or locks the cage ring connecting members 80 into position intermediate the retaining member 134 and the ring member 60. The barriers created by the retaining members 134 along each ring member 60 will prevent installed cage ring connecting members 80 from disengaging from the ladder cage 10 should a person wish to rest up against the interior of the installed cage ring connecting members 80 while utilizing the ladder 150, or if a person were to accidentally knock into the installed cage ring connecting members 80 while utilizing the ladder 150.

The retaining member 134 is positioned at an ascending vertical angel in relation to the axis of the latching member body 28 such that it is cantilevered at the front edge 148 of the latching member aperture 38 and extends backward and upward away from the striking end 40 and towards the ring member 60, when installed thereon. The positioning of the retaining member 134 in combination with the latching member body 28 creates a larger surface area around this area of the latching member body 28 in relation to the outer surface of the adjacent section of the latching member body 28. This larger surface area begins at the location of retaining member 134 proximate the front edge 148 of the latching member aperture 38 and increases along a part of the length of the retaining member 134 along the aperture 38 in the direction of the ring member 60.

In alternative embodiments, any type of spring lock or latching mechanism, slam latch, Norfolk latch, Suffolk latch, toggle latch, other latching mechanism, and/or other self-contained retaining mechanism, may be utilized in some or all of the latching members, whether now know or later developed.

In an alternative embodiment, the latching member 20 is generally cylindrical having a first threaded end 34 and threading along at least a portion of its retaining end 94. A wing nut, or similar retainment mechanism, may be utilized to retain the cage ring connecting members 80 in place in relation to the ring member 60 by inserting the ring securing end 82 and/or 84 onto the latching member body 28 and then securing same with the wing nut or other retainer.

The installed cage ring connecting members 80 may be quickly uninstalled by depressing the retaining member 134 thereby lowering the retaining member 134 in relation to the outer surface of the latching member body 28 by compressing the resilient member 42, which will allow the cage ring connecting member apertures 86 to slide over the retaining member 134 thereby releasing them from the latching member 20 and the ladder cage 10. The depression of the retaining member 134 acts to lower the retaining member 134 into the aperture 38 and/or cavity 35 of the latching member body 28, by at least partially compressing the resilient member 42, enough such that the combination of the area encompassing the retaining member 134 and the surrounding latching member body 28 is made smaller than the diameter of the aperture 86 of the subject cage ring connecting member 80.

The cage ring connecting members 80 are easily installed onto the self-contained latching members 20 by sliding the aperture 86 of the cage ring connecting member 80 over the latching member 20 and over the retaining member 134 such that the weight of the cage ring connecting member 80, either alone or in combination with additional pressure, will depress the retaining member 134, thereby compressing the resilient member 42, allowing the cage ring connecting member 80 to move over the retaining member 134 and into position intermediate the retaining member 134 and the ring member 60. Once the pressure on the retaining member 134 is released the resilient member 42 will act upon the retaining member 134 and will move the retaining member 134 back into its uncompressed position, or its retaining position, such that the retaining member 134 will protrude out of the latching member aperture 38 enough to act as a barrier in order to retain the cage ring connecting member 80 onto the latching member 20.

Referring to FIGS. 2, 5, 5A, 5B, 6, 8A, and 8B, the latching member 20 is removably attached to the ring member 60 by latching member attachments 43. In the exemplary embodiment shown, the latching member body 28 is retained on the ring member 60 through the latching member attachments 43 consisting of a nut 156 and a retaining nut 154 threaded on the threaded end 34 of the latching member body 28, in combination with the anchor plate 26. This combination allows for the easily removable attachment of the latching member 20 to the ring member 60. This removable coupling allows for repairs to be made to the latching members 20 when needed in the field thereby preventing the need to completely remove the cage ring 50 when there is a defect or issue with a latching member 20. Rather, the affected latching member 20 may be removed from the ring member 60 and replaced with properly functioning latching members 20 while the cage ring 50 remains installed on the ladder cage system 10. This combination also allows for the straight replacement of latching members 20 rather than the repair and later replacement of the subject latching members 20 with little to no downtime.

The latching member attachments 43 may be any fastener that will allow either permanent or temporary coupling of the latching member 20 to the ring member 60, with or without the use of the anchor plate 26, such as welding, wing nuts, clamps, or other now known or later discovered fastening methods.

In the depicted exemplary embodiment, a first nut 156 is threaded onto the threaded end 34 of the latching member body 28 proximate the retaining member 134. A retaining nut 154, is placed within the open space 18 of the anchor plate 26 and lined up with the aperture 66. The end of the threaded end 34 is inserted through the anchor plate aperture 66 and the retaining nut 154 is threaded onto the threaded end 134 thereby removably securing the latching member 20 through its latching member body 28 onto the ring member 60. The latching member 20 may then be removed by unthreading the retaining nut 154 from the threaded end 34 of the latching member body 28 and removing the latching member 20. This allows for easy and quick replacement or repair of defective latching members 20.

The first nut 156 acts to work with the retaining nut 154 to secure the latching member body 28 to the anchor plate 26. The latching member attachments 43, e.g. nut 156 and retaining nut 164, may act to prevent rotational movement of the latching member body 28. The latching member attachments 43 may be jam nuts.

In an alternative embodiment, the anchor plate 26 has three ring attachment members 64 extending from the body member 62. Two of the three ring attachment members 64 extend from opposing sides of the body member 62. The third ring attachment member 64 extends between the first two ring attachment members 64 along corresponding sides leaving an opening along the opposing corresponding sides of the first two ring attachment members 64. An open space 18 is formed within the three ring attachment members 64 intermediate the ring member 60 and the body member 62. This configuration allows for only one opening to the open space 18 of the anchor plate 26 such that the retaining nut 154 may be placed into the open space 18 without the threat of the retaining nut 154 slipping out a second opening and dropping to the ground below.

In an alternative embodiment, a first nut 156 may not be utilized. Instead, the latching member body 28 may have a protrusion extending around its outer diameter intermediate its threaded end 34 and aperture 38. The retaining nut 154 is inserted into the anchor plate's open space 18 and lined up with the aperture 66. The threaded end 34 of the latching member body 28 is inserted into the aperture 66 of the anchor plate 26 and the retaining nut 154 is threaded onto the threaded end 34 to removably secure the latching member 20 into place.

In an alternative embodiment, the anchor plate 26 contains an internally threaded member that is fixedly connected to or within the open space 18 of the anchor plate 26 proximate the aperture 66. Alternatively, anchor plate 26 may be formed of the internally threaded member such that the internally threaded member is not contained in the open space 18. Alternatively, the ring member 60 may have apertures therethrough spaced along the length of the ring member 60 wherein the apertures fixedly contain internally threaded members such that the externally threaded end 34 of the latching member body 28 may be inserted therein. The internally threaded member may be fixedly connected through a weld or other permanent fastening. The externally threaded end 34 of the latching member body 28 may be inserted into the aperture 66 of the anchor plate 26 and threadedly connected to the internally threaded member to removably retain the latching member body 28 to the ring member 60.

In an alternative embodiment, the anchor plates 26 are integrally formed along the ring member 60.

In an alternative embodiment, the ring member 60 includes a plurality of apertures along its perimeter. Wherein the threaded end 34 of the latching member 20 is inserted into the aperture of the ring member 60, and a retaining nut 154 is threaded onto the threaded end 34. The retaining nut 154 may act on a nut 156 that is positioned on the opposite side of the ring member 60 along the threaded end 34 of the latching member 20 to retain the latching member 20 in place.

In an alternative embodiment, the latching member 20 may have a protrusion 156, other than a nut such as a protrusion that is integrally formed on the latching member body 28, or that is welded to the latching member body 28, or otherwise attached thereto, that extends therefrom proximate the threaded end 34 that acts with the retaining nut 154 to retain the latching member 20 in position along the ring member 60.

Figure 12:
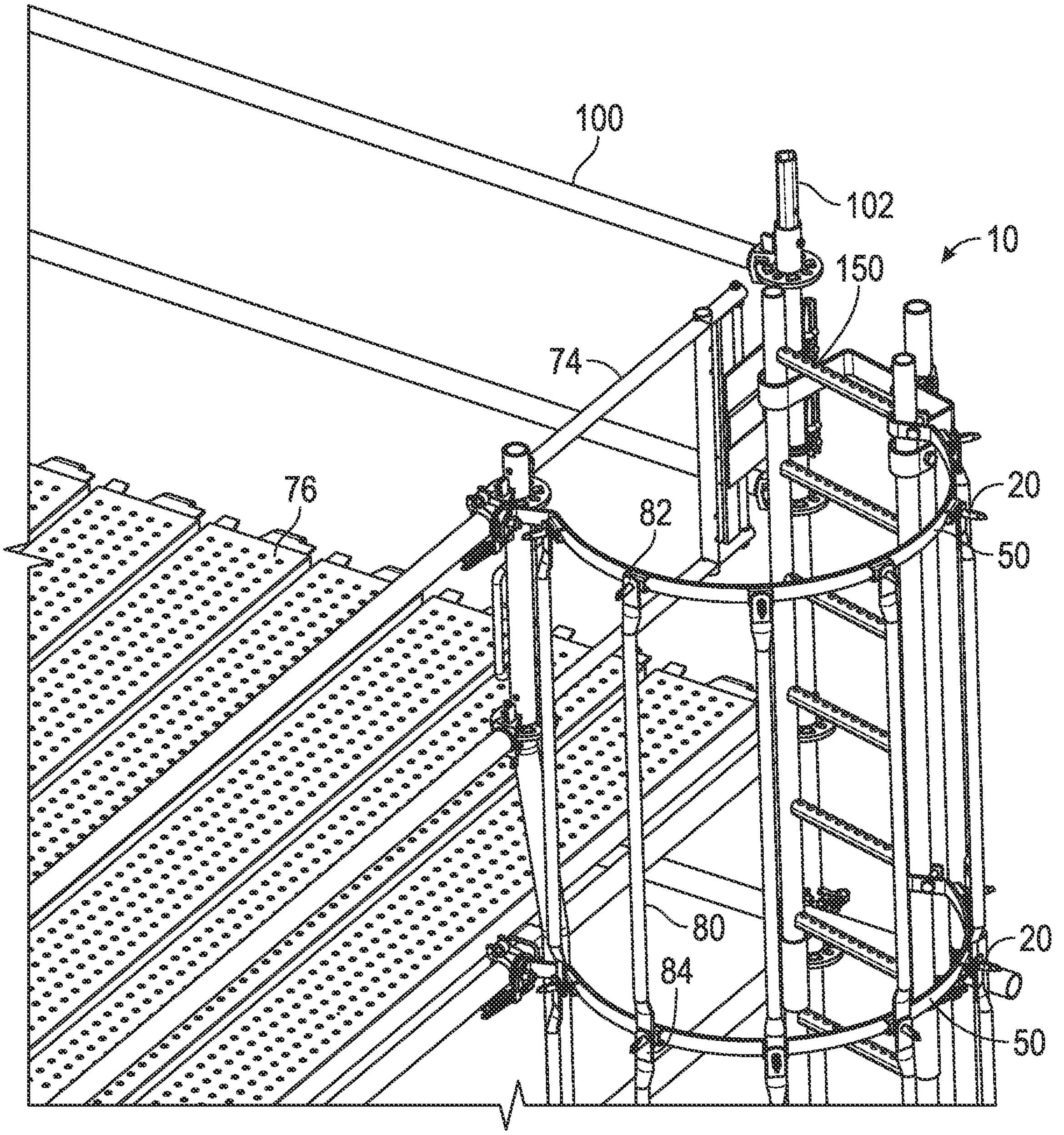
FIG. 12 is a perspective view of an exemplary embodiment of the ladder cage installed on an exemplary scaffold.

FIG. 12 shows an exemplary embodiment of a ladder cage 10 as assembled at least partially around a ladder 150 of a scaffold 100. The depicted scaffold 100 is meant to be representative of any scaffold system now existing or later developed and is not meant to, and shall not, limit the invention in any way. It is common for ladders 150 to be attached to scaffolds 100 to allow movement between the varying levels of the scaffold 100. The depicted ladder 150 is secured to the scaffold 100 at the post 102 of the scaffold 100; however, the subject ladder 150 may be secured in relation to a scaffold 100, or any other object, by any now known or later developed method.

The cage rings 50 are shown as secured to the ladder 150 of the scaffold 100 at its first coupling end 52 and secured to the scaffold 100 at its second coupling end 54 when installed. A cage ring 50 is attached to an adjacent cage ring 50 through the use of cage ring connecting members 80, which extend between the adjacent cage rings 50 and are secured to each by latching members 20. An optional gate or guard rail 74 may be utilized to block the exit from the platform 76 of the scaffold 100.

The cage rings 50 are removably installed onto the scaffold 100 and ladder 150. In an alternative embodiment, one or more of the cage rings 50 may be permanently installed on the scaffold 100 and/or ladder 150 or any other object.

It is further understood that the cage rings 50 may be connected to other items other than scaffolds 100 or ladders 150 depending on the particular configuration of the scaffold system the cage rings 50 are to be utilized with. It is possible that various spaces or other structures may be placed around the scaffold 100 or ladder 150, and the cage rings 50 may connect to one or more of these additional structures rather than strictly to the scaffold 100 at one end and the ladder 150 at the opposite end. Regardless, the purpose of the cage rings 50 is to provide the structure for the ladder cage 10 and facilitate the installation of the cage ring connecting members 80 in relation to the scaffold system. Therefore, the structure that the cage ring 50 is specifically physically connected to is not important to the system as a whole, only that the cage ring 50 is positioned such that it is at least partially around the ladder 150.

Figure 9:
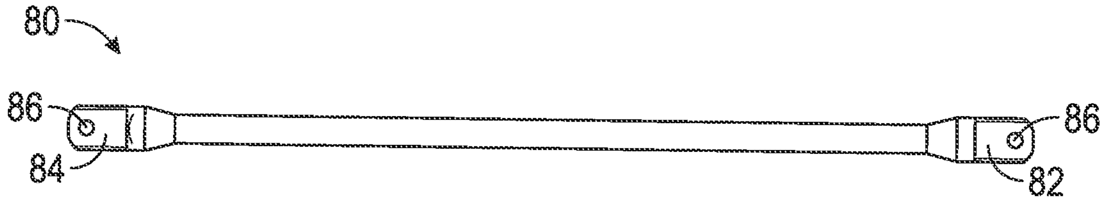
FIG. 9 is a front view of an exemplary cage ring connecting member.
Figure 10A:
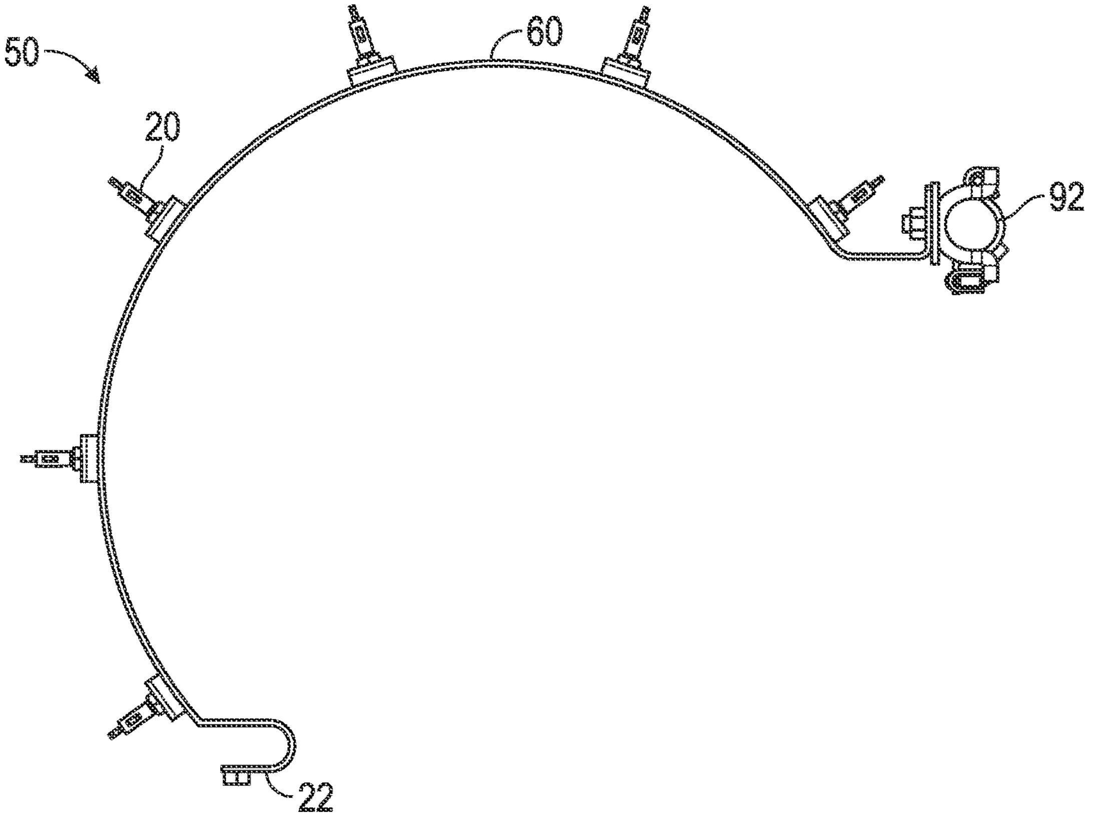
FIG. 10A is a top view of an alternative embodiment of the cage ring.
Figure 10B:
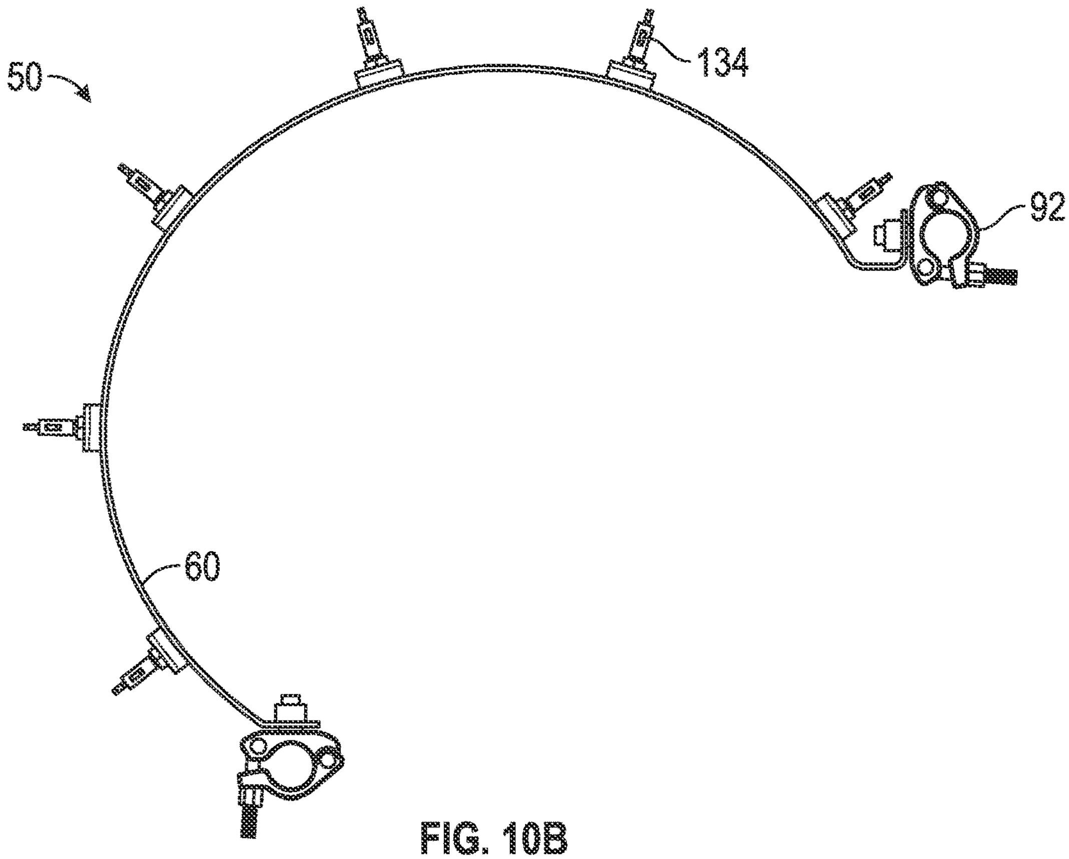
FIG. 10B is a top view of an alternative embodiment of the cage ring.
Figure 11A:
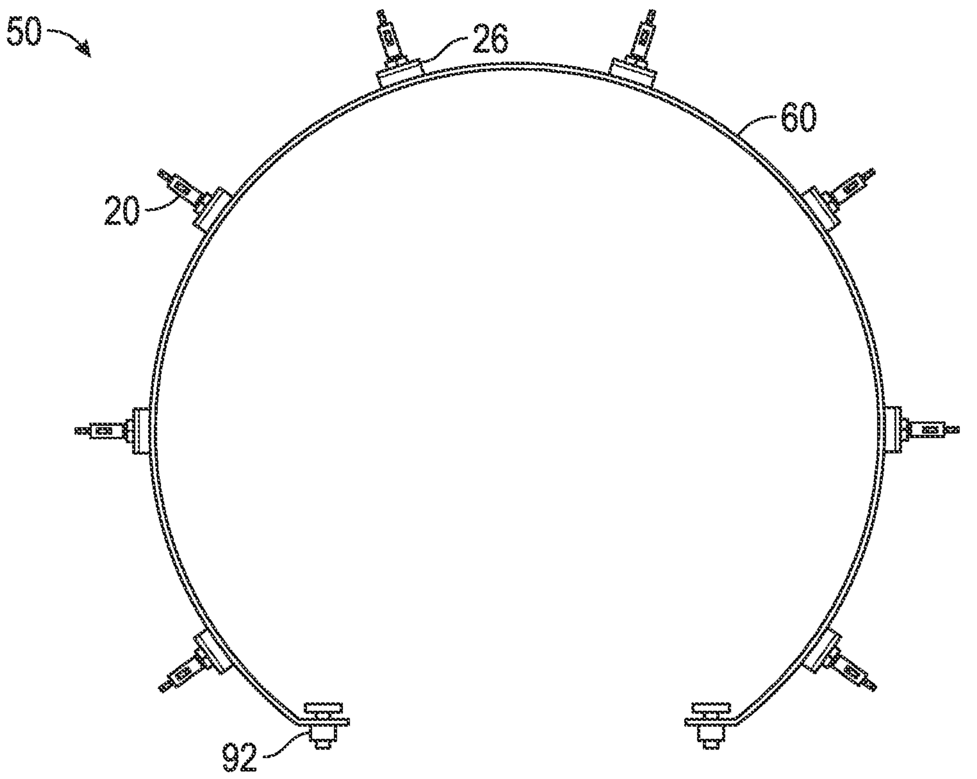
FIG. 11A is a top view of an alternative embodiment of the cage ring.
Figure 11B:
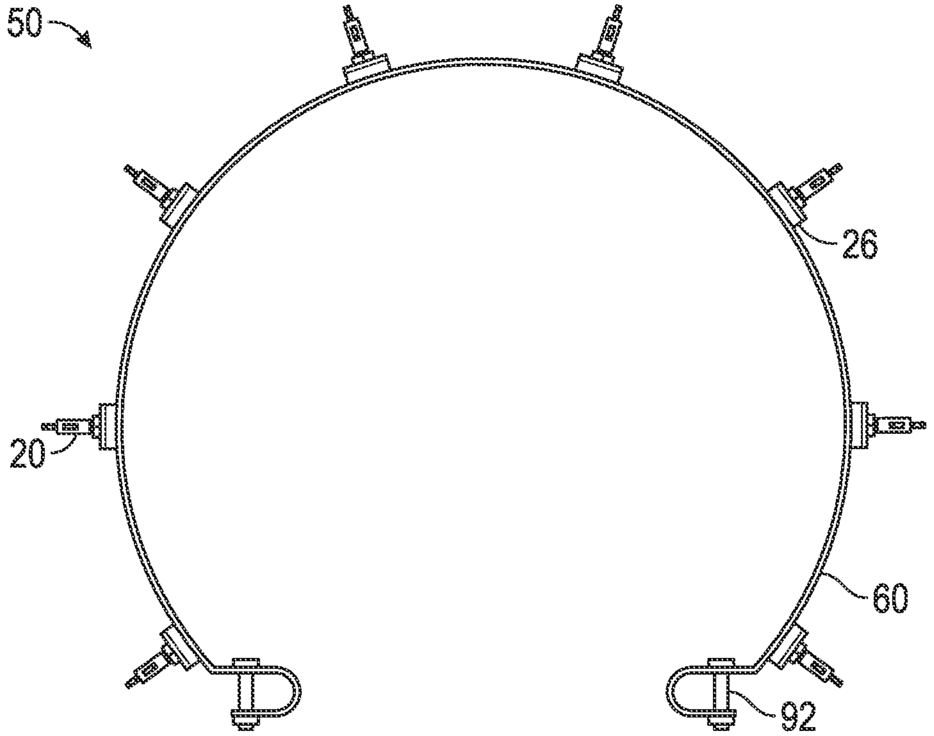
FIG. 11B is a top view of an alternative embodiment of the cage ring.

Referring to FIG. 9, while the depicted exemplary cage ring connecting members 80 are generally tubular members having two opposing ends, a first ring securing end 82 and a second ring securing end 84, the cage ring connecting members 80 may take any now known or later developed form with a function of same being to connect the adjacent cage rings 50. Another function of the combination of a plurality of cage ring connecting members 80 is to provide an enclosure, either partially or fully, around the ladder 150 when installed.

The first ring securing end 82 and second ring securing end 84 of the cage ring connecting members 80 each have an aperture 86 extending therethrough. The aperture 86 is sized to fit over at least a portion of the latching member 20 such that the aperture 86 will be disposed intermediate the retaining member 134 of the latching member 20 and the ring member 60 when installed. The cage ring connecting members 80 are secured to the cage ring 50 by the interaction of the latching members 20 with the first ring securing end 82 and/or the second ring securing end 84. The latching members 20 will act to retain the cage ring connecting members 80 adjacent to the cage rings 50 once same are installed.

The latching members 20 are referred to throughout this description as self-contained. The descriptor "self-contained" refers to the rapid installation, and rapid removal, of the cage ring connecting members 80 onto the ladder cage utilizing only the self-contained latching members 20 wherein the installation and removal of the cage ring connecting members 80 does not require any additional external materials, such as screws, bolts, nuts, or other types of now known or later discovered fasteners. The ability of the latching members 20 to receive the cage ring connecting members 80 and retain same thereon is completely self-contained in the latching member 20 itself. The "self-contained" descriptor does not refer to the attachment of the latching member 20 to the ring member 60 whether through the anchor plate 26 or otherwise as some embodiments of the attachment of the latching member 20 to the ring member 60 do require external fasteners, such as nut 156 and the retaining nut 154.

In operation, the scaffold 100, ladder 150, and ladder cage system 10 are generally installed on site at the desired location. Generally, at least a portion of the scaffold 100 and the ladder 150 will be installed before the ladder cage system 10 is installed as the ladder cage system 10 is connected to a portion of both the scaffold 100 and ladder 150.

The latching members 20 are installed on the ring member 60 as previously described. The installation of some or all of the latching members 20 may be accomplished off-site. In an alternative embodiment, the installation of some or all of the latching members 20 may be accomplished on site. In a further alternative embodiment, the installation of some or all of the latching members 20 may be accomplished after the cage rings 50 are installed on the object the ladder cage 10 is to be used with, such as a ladder 150, a scaffold 100, a platform 76, or any other object, and/or any combination of the foregoing.

The cage ring connecting member 80 installing step comprising installing the cage ring connecting members 80 onto the cage rings 50 utilizing self-contained latching members 20. The step involves roughly lining up the aperture 86 on both the first ring securing end 82 and the second ring securing end 84 of the cage ring connecting member 80 with the corresponding latching members 20 that are positioned on adjacent cage rings 50, and moving the cage ring connecting member 80 towards the cage rings 50 such that the apertures 86 surround the respective latching members 20 and the apertures 86 slide over the respective latching members 20 until the cage ring connecting member 80 is installed in position between the ring members 60 and the retaining members 134. Generally, the first ring securing end 82 of the subject cage ring connecting member 80 will couple to a first cage ring 50, and the second ring securing end 84 of the same cage ring connecting member 80 will couple to an adjacent corresponding second cage ring 50. When utilizing the depicted exemplary embodiment, the movement of the cage ring connecting member 80 over the corresponding latching members 20 will engage the retaining member 134, thereby depressing the retaining member 134 and placing compressive pressure onto the resilient member 42 causing the retaining member 134 to move to it compressed position, which to allow passage of the aperture 86 over the latching member body 28. In an alternative embodiment, the ends 82, 84 of the cage ring connecting member 80 are installed one at a time onto the respective cage rings 50. The cage ring connecting member 80 installing step is repeated as often as is necessary in order to install the desired number of cage ring connecting members 80 on the ladder cage 10.

The self-contained latching member 20 may comprise any type of spring lock or latching mechanism, slam latch, Norfolk latch, Suffolk latch, toggle latch, other latching mechanism, and/or other self-contained retaining mechanism such that the cage ring connecting member 80 may be installed on the cage rings 50 without the need for extraneous materials not contained in the latching member 20 and/or the cage ring connecting member 80. This allows for rapid installation through the automatic latching or locking of the cage ring connecting member 80 onto the latching member 20. The self-contained latching member 20 may also allow for the removal of the cage ring connecting member 80 from the cage ring 50 without the need to physically remove any component from the latching member 20.

The cage ring connecting member 80 removing step involves depressing the retaining member 134 on at least one of the latching members 20 which will compress the resilient member 42 and place the retaining member 134 into its compressed position, and pulling the coupled end 82 or 84 of the cage ring connecting member 80 away from the ring member 60 and past the retaining member 134 until it can be removed from the latching member 20. In an alternative embodiment, the entire cage ring connecting member 80 is removed at once by depressing both retaining members 134 on each respective latching member 20 in relation to both the first ring securing end 82 and the second ring securing end 84 of the same cage ring connecting member 80. The cage ring connecting member removing step is repeated as often as is necessary in order to remove the desired number of cage ring connecting members 80 from the ladder cage.

The latching member 20 installing step may include threading a nut 156 onto the threaded end 34 of the latching member body 28. Inserting a retaining nut 154 into the open space 18 of the anchor plate 26, and lining up the retaining nut 154 with the aperture 66 of the anchor plate 26. Installing the threaded end 34 of the latching member body 28 into the aperture 66 of the anchor plate 26 and threadedly connecting the latching member body 28 to the retaining nut 154 until the connection between the nuts 154, 156 is secure.

Alternatively, a different latching member attachment 43 other than the nut 156 and retaining nut 154 is utilized as described above.

In an alternative embodiment, a retaining nut 154 is not utilized. The inner diameter of the aperture 66 of the anchor plate 26 may have internal threading that can accept the external threading of the latching member body 28. Alternatively, the anchor plate 26 may not contain the open space 18 but may contain a threaded receptacle for the threaded end 34 of the latching member body 28, wherein the latching member body 28 is threadedly connected thereto.

Alternatively, the latching member 20 installing step may not involve the use of corresponding threading and may involve the use of a clamp, lock pin, or other item that would allow for removable attachment of the latching member 20 to the ring member 60. Alternatively, the latching member installing step may involve permanently attaching the latching member 20 to the ring member 60 or the anchor plate 26 by welding or other means.

The latching member 20 removing step may include disconnecting the latching member body 28 from the ring member 60. This step may be accomplished by disconnecting the latching member body 134 from the anchor plate 26 by unthreading the threaded end 34 of the latching member body 28 from the retaining nut 154. In the alternative embodiments when a retaining nut 154 is not utilized, the latching member body 28 is removed from the device that is releasably retaining it to the ring member 60, such as by releasing the clamp, removing the lock pin, removing the screw, and the like.

The latching member 20 repairing step involves repairing the previously installed latching member 20. The latching member 20 may be removed from the cage ring 50 utilizing the latching member 20 removing step prior to the latching member 20 repairing step. The repair may occur on site or may be performed at another location. The subject latching member 20 may have been replaced on the cage ring 50 during the repair process.

The latching member 20 replacing step involves installing either a repaired latching member 20, a used latching member 20, or a new latching member 20 as described in the latching member installing step. The latching member 20 replacing step may be performed on site or may be performed at another location. If performed on site, the latching member 20 replacing step may be performed while the subject cage ring 50 is installed on the ladder cage 10 or while the cage ring 50 is not installed on the ladder cage 10.

The term spring as used herein refers to any resilient member of any shape that is operable in the invention, and may be made from any suitable material. For example, the spring may be comprised of a compressible fluid.

The depicted exemplary embodiments may be altered in a number of ways while retaining the inventive aspect, including ways not specifically disclosed herein.

Throughout the description and claims of this specification, the words “comprise” and “contain” and variations of the words, for example “comprising” and “comprises”, means “including but not limited to”, and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features and characteristics described in conjunction with a particular aspect, embodiment or example of the invention are to be understood to be applicable to any other aspect, embodiment or example described herein unless incompatible therewith.

All of the features disclosed in this specification (including any accompanying claims, abstract and drawings), and/ or all of the steps of any method or process so disclosed, may be combined in any combination, except combinations where at least some of such features and/or steps are mutually exclusive. In other words, the method steps have not been provided for in any particular sequential order and may be rearranged as needed or desired, with some steps repeated sequentially or at other times, during use.

Each feature disclosed in this specification (including any accompanying claims, abstract and drawings), may be replaced by alternative features serving the same, equivalent, or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

We claim:

1. A ladder cage, comprising:

a plurality of cage rings, each cage ring having a length;

a plurality of latching members, each latching member having a body;

each latching member having an outer surface area extending at least partially therearound;

each cage ring having a plurality of the latching members spaced along the length of the respective cage ring;

at least one of the latching members having a retaining member, wherein the retaining member is movable between a retaining position, wherein at least a portion of the retaining member extends at least partially away from the body of the latching member thereby increasing at least a portion of the outer surface area around the latching member at the retaining member location in relation to the outer surface area around the latching member proximate the retaining member, and a non-retaining position, wherein at least a portion of the retaining member is moved towards the body of the latching member thereby decreasing the outer surface area around the latching member at the retaining member in relation to the retaining member's retaining position;

wherein each latching member having an anchoring end proximate the cage ring and a retaining end distal the anchoring end, and the retaining member is positioned proximate the retaining end of at least one of the latching members;

a plurality of anchor plates spaced along the length of the respective cage rings, wherein the anchor plates couple one or more of the latching members to the cage rings;

each anchor plate having at least one ring attachment member extending therefrom and an aperture extending through a portion of the anchor plate;

wherein the at least one ring attachment member attaches the anchor plate to the cage ring;

the latching member having external threading along a portion of its anchoring end;

wherein the anchoring end of the latching member is placed within the anchor plate aperture and an internally threaded fastener is coupled to the external threading of the anchoring end to retain the latching member in the anchor plate aperture; and a plurality of cage ring connecting members extending between at least two cage rings and retained on the cage rings by respective latching members.

2. The ladder cage of claim 1, further comprising:

the retaining member having a retaining end extending distal the latching member body;

wherein the latching members each have a latching member aperture extending through at least a portion of the body of the latching member, wherein the retaining member is positioned at least partially within the aperture; and wherein in the retaining position the retaining end of the retaining member extends further outward away from the aperture than when the retaining member is in its non-retaining position.

3. The ladder cage of claim 2, further comprising:

each latching member that contains a retaining member having a cavity extending at least partially therein;

the cavity ending at an innermost inner wall within the latching member;

the latching member aperture extending along at least a portion of the sidewall proximate the cavity such that the cavity creates a passageway from the exterior of the latching member to the interior of the cavity; and wherein a portion of the retaining member is retained inside the cavity and a portion of the retaining member extends outside of the cavity through the aperture.

4. The ladder cage of claim 3, further comprising:

a resilient member contained within the cavity of the latching member;

the resilient member being compressible to allow for compression of the resilient member when pressure is applied to at least a portion of the retainment member, and the resilient member being capable of returning to its non-compressed form when it is no longer in a compressed state;

the retaining member having an underside; and wherein a portion of the resilient member is in contact with the underside of the retaining member.

5. The ladder cage of claim 4, further comprising:

an internal protrusion extending into the latching member cavity opposite the latching member aperture;

the resilient member having a base and two arms extending from the base;

the resilient member base being proximate the innermost inner wall of the cavity;

one of the arms of the resilient member positioned proximate a portion of the internal protrusion;

the other arm of the resilient member being in contact with the underside of the retaining member;

a striking plate having at one end the retainment member and at the opposite end a striking end;

the latching member having a cavity opening extending through its retaining end, wherein the latching member aperture is disposed intermediate the cavity opening in the retaining end and the anchoring end of the latching member; and wherein the striking end at least partially extends out of the cavity at the cavity opening.

6. The ladder cage of claim 1, further comprising:

each cage ring is elongated and each cage ring having a first coupling end and a second coupling end;

wherein each anchor plate is positioned on the outer surface of the respective cage ring and is coupled to a latching member proximate the anchoring end of each latching member;

wherein each latching member is generally cylindrical in shape;

wherein each latching member is removably coupled to the respective anchor plate; and wherein each anchor plate is fixedly attached to the respective cage ring.

7. A ladder cage, comprising:

a plurality of cage rings, each cage ring having an outer surface along a length of the cage ring, the length extending between a first coupling end and a second coupling end of the cage ring;

a latching member, the latching member having a body;

the cage rings each having a plurality of the latching members spaced along the length of the outer surface of each respective cage ring;

at least one of the latching members having a retaining member disposed along a side of the latching member, wherein a portion of the length of the retaining member extends outward away from the outer surface of the latching member, wherein the retaining member is movable between a retaining position and a non-retaining position;

wherein, in the retaining position at least a portion of the retaining member extends at least partially away from the body of the latching member thereby increasing at least a portion of the outer surface area around the latching member at the retaining member location in relation to the outer surface area around the latching member proximate the retaining member;

a plurality of cage ring connecting members extending between at least two cage rings, each cage ring connecting member having a first ring securing portion and a second ring securing portion, wherein each of the first ring securing portions and the second ring securing portions contain an aperture extending therethrough;

wherein the first ring securing portion of one cage ring connecting member couples to a cage ring and the second ring securing portion of the same cage ring connecting member couples to another cage ring;

wherein the cage ring connecting members are retained on the respective latching members in a position intermediate the cage ring and the respective retaining member;

a plurality of anchor plates spaced along the length of the respective cage rings, wherein the anchor plates couple the corresponding latching members to the cage rings;

each anchor plate having at least one ring attachment member extending therefrom and an aperture extending through a portion of the anchor plate;

wherein the at least one ring attachment member attaches the anchor plate to the cage ring;

the latching members each having an anchoring end and an opposite latching member retaining end distal the anchoring end;

the latching member having external threading along at least a portion of its anchoring end; and wherein the anchoring end is placed within the anchor plate aperture, and an internally threaded fastener is coupled to the external threading of the anchoring end to retain the latching member in the anchor plate aperture.

8. The ladder cage of claim 7, further comprising:

the retaining member having a retaining end;

wherein the latching members each have a latching member aperture extending through a portion of the body of the latching member, wherein the retaining member is positioned within the aperture;

the retaining member being movable between the retaining position and the non-retaining position, wherein in the retaining position the retaining end of the retaining member extends further outward from the aperture than when the retaining member is in its non-retaining position; and wherein at least one of the latching members is removably coupled to the cage ring.

9. The ladder cage of claim 8, further comprising:

the latching member having a cavity extending at least partially therein;

the cavity ending at an innermost inner wall within the latching member;

the latching member aperture extending along a portion of the sidewall proximate the cavity such that the cavity creates a passageway from the exterior of the latching member to the interior of the cavity;

wherein a portion of the retaining member is retained inside the cavity and a portion of the retaining member extends outside of the cavity through the aperture;

a resilient member contained within the cavity of the latching member;

the resilient member being compressible to allow for compression thereof when pressure is applied to the retainment member, and wherein the resilient member is capable of returning to its original form, or close thereto, when it is no longer in a compressed state;

the retaining member having an underside; and wherein a portion of the resilient member is in contact with the underside of the retaining member.

10. The ladder cage of claim 9, further comprising:

an internal protrusion extending into the latching member cavity opposite the latching member aperture;

the resilient member having a base and two arms extending from the base;

the resilient member base being proximate the innermost inner wall of the cavity;

one of the arms of the resilient member positioned proximate a portion of the internal protrusion;

the other arm of the resilient member being in contact with the underside of the retainment member;

a striking plate having at one end a striking end;

the latching member having a cavity opening extending through its latching member retaining end; and wherein the striking end at least partially extends out of the cavity at the cavity opening.

11. The ladder cage of claim 7, further comprising:

the anchor plate having two opposing ring attachment members extending from the anchor plate to the cage ring thereby attaching the anchor plate to the cage ring;

the two opposing ring attachment members defining an open space between the anchor plate aperture and the cage ring; and wherein the internally threaded fastener is at least partially disposed within the open space.

12. A method of using a ladder cage, comprising:

providing a plurality of cage rings having a plurality of latching members spaced along the length of the outer surfaces of the cage rings, the latching members each having a retaining member positioned thereon, wherein the retaining member is movable between a retaining position, wherein at least a portion of the retaining member extends at least partially away from the body of the latching member thereby increasing at least a portion of the outer surface area around the latching member at the retaining member location in relation to the outer surface area around the latching member proximate the retaining member, and a non-retaining position, wherein at least a portion of the retaining member is moved towards the body of the latching member thereby decreasing the outer surface area around the latching member at the retaining member in relation to the retaining member's retaining position;

connecting adjacent cage rings by installing a plurality of cage ring connecting members therebetween by utilizing the latching members on the cage rings and repeating this step to form a ladder cage, wherein the cage ring connecting members contain apertures therethrough for acceptance of the respective latching members therein, and wherein the installation of the cage ring connecting members place the respective apertures thereof in a position intermediate the respective cage ring and the corresponding retainment member on the respective latching member, with the retainment member is in its retaining position; and a replacing step comprising replacing at least one latching member by removing it from the cage ring and replacing the subject latching member with a new or repaired latching member.

13. The method of claim 12, wherein the combined cage rings and cage ring connecting members are removably coupled to at least a portion of a ladder.

14. The method of claim 12, further comprising removably installing the cage rings to at least a portion of a ladder prior to the combination step combining adjacent cage rings to each other utilizing the cage ring connecting members.

15. The method of claim 12, wherein the replacing step occurs at the work site while the subject cage ring is at least partially installed on a ladder.

* * * * *